United States Patent [19]

Takata

[11] Patent Number: 4,831,320
[45] Date of Patent: May 16, 1989

[54] DUTY FACTOR CONTROL METHOD

[75] Inventor: Koji Takata, Itami, Japan

[73] Assignee: Sumitomo Electric Industries, Ltd., Osaka, Japan

[21] Appl. No.: 191,887

[22] Filed: May 9, 1988

[30] Foreign Application Priority Data

May 7, 1987 [JP] Japan .............................. 62-110960

[51] Int. Cl.$^4$ ............................................. H02P 8/00
[52] U.S. Cl. .................................... 318/696; 318/685
[58] Field of Search .............................. 318/696, 685; 73/862.58

[56] References Cited

U.S. PATENT DOCUMENTS 4,608,958 9/1986 Sakakibara et al. ............ 318/696 X
4,651,838 3/1987 Hamilton et al. ............ 73/862.58 X Primary Examiner—William M. Shoop, Jr.
Assistant Examiner—Saul M. Bergmann
Attorney, Agent, or Firm—Wenderoth, Lind & Ponack

[57] ABSTRACT

A duty factor control method for electromechanical actuators which can take only mutually discrete positions. A required quantity of state R which is in intermediate condition between two discrete positions is given for every upper-level control cycle Tr. According to the R value, the durations Ta and Tb of first and second states (such as ON and OF positions) of the actuator are determined. In order to obtain the required R smoothly and quickly, the sum $Tc=Ta+Tb$ has to be set as small as possible. But the Ta and Tb values have to be larger than their minimum values Tam and Tbm which are determined by the dynamic characteristics of the actuator. Thus, the Ta and Tb values are determined so that either Ta or Tb will be set at its minimum value Tam or Tbm while the other will take a value corresponding to R. Ta, Tb, Tam and Tbm are set as multiples of a unit cycle To so that the duration of state will be measured digitally for every unit cycle To by a counter. When it is judged that the duration of state has reached the preset value Ta or Tb, the state is changed over from one to the other. When the R value and thus Ta and Tb are renewed at the end of every cycle Tr, the state at the end of cycle Tr is maintained until its duration exceeds a renewed Ta and Tb value. Also, if necessary, either Ta or Tb may be set at zero so that one state will persist for the entire cycle Tr.

11 Claims, 5 Drawing Sheets

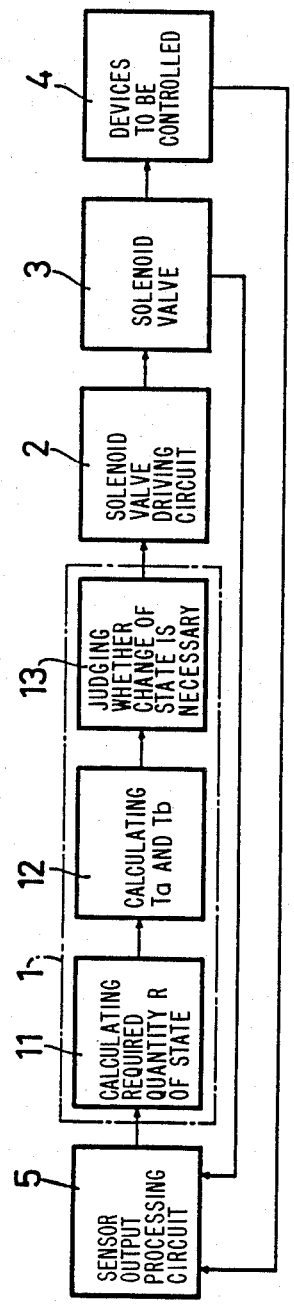
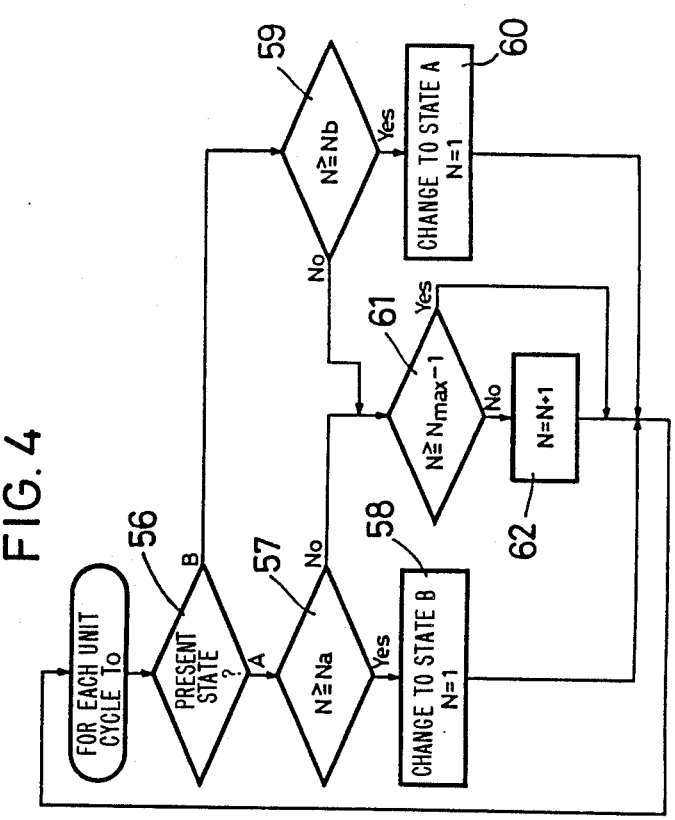
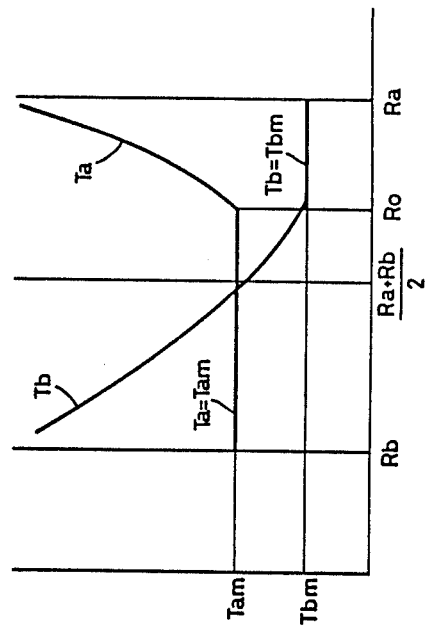

DUTY FACTOR CONTROL METHOD

The present invention relates to a method for duty factor control or pulse width control for electromechanical actuators (such as solenoid valves and step motors) which can take only a plurality of mutually discrete positions (hereinafter referred to as discrete-position type electro-mechanical actuators). By duty factor control, any desired intermediate condition is approximately obtained by varying the ratio between the durations for the mutually discrete positions.

In the duty factor control, it has been a common practice to divide a fixed period Tc into a period Ta during which a first position (e.g. ON position) persists and a period Tb during which a second position (e.g. OFF position) persists so as to satisfy formula $$D(\text{duty factor}) + \frac{Ta}{Tc} = \frac{Ta}{Ta + Tb}, Ta + Tb = Tc$$

in order to obtain any desired duty factor.

Such a prior art method will not encounter any problem as long as the period Tc (=Ta+Tb) can be set to be sufficiently small compared with a predetermined control period Tr (hereinafter referred to as "upper-level control period") in an upper-level control loop in an electronic control system which executes logical operations based upon the outputs of various sensors and gives a duty factor to a driving unit of a discrete-position type electromechanical actuator or a control system for each control period Tr. But practically, the minimum values of Ta and Tb are limited because the dynamic characteristics of the discrete-position type electromechanical actuator to be controlled are limited. Further, if it is necessary to set the duty factor to nearly 1.0 or nearly zero rather than at around 0.5, the period Tc which is one control period for the electromechanical actuator has to be set substantially large in comparison with the upper-level control period. This will impair the control accuracy.

An object of the present invention is to provide a duty factor control method which obviates the above-said shortcomings.

In accordance with the present invention, there is provided a variable-cycle duty factor control method for a discrete-position type electromechanical actuator, comprising the steps of setting a fixed unit cycle To which is shorter than an upper-level control cycle Tr which is the cycle for an upper-level control loop, calculating and setting for every upper-level control cycle Tr a duration Ta for a first position of the actuator and a duration Tb for a second position of the actuator on the basis of a desired quantity R for the desired intermediate condition so that the Ta and Tb values will be multiples of the To value and will not be smaller than their minimum values Tam and Tbm, respectively, which are determined by the dynamic characteristics of the actuator, judging for every cycle To whether or not the duration for the first or second position has reached the value Ta or Tb, in other words whether or not it is necessary to switch from one position to the other, and issuing a command to change the position from one to the other if so judged.

In the variable-period duty factor control method according to the present invention, the upper-level control loop in an electronic control device executes predetermined logical operations on the basis of the inputs from various sensors and for each control cycle Tr (fixed or variable) calculates R which is a quantity or value somewhere between the first quantity Ra proper to (representative of) the first state or position (state A) and the second quantity Rb proper to (representative of) the second state or position (state B) of a discrete-position type electromechanical actuator (Ra≧R≧Rb). Then durations Ta and Tb during which the first and second states sustain will be calculated on the basis of the target quantity R. By keeping the first state for a period Ta and the second state for Tb, a desired quantity R is obtained which corresponds to a duty factor $$D = \frac{Ta}{Ta + Tb}$$

According to the present invention, one control cycle Tc (=Ta+Tb) is given not as a constant value but as such a variable value that the target quantity R which is given for each upper-level control period Tr can be attained in the shortest period of time Ta and Tb are set at multiples of a unit period To. Whether or not the state A or B has lasted for period Ta or Tb is judged for every period To. The moment period Ta or Tb has passed, the position is switched from one state to the other When the upper-level control cycle Tr changes to another cycle and new Ta and Tb values are given, the same routine is repeated for the renewed Ta and Tb without intermission.

According to the present invention, Tc which is the sum of Ta and Tb is variably given for each upper-level cycle Tr, Ta and Tb being set at such values as to attain the target quantity R in the shortest time. Thus, the target quantity can be attained quickly and accurately. Since Tc is fixed in the conventional method, the target quantity can not be attained until the end of fixed period Tc. This will greatly impair the responsiveness and accuracy of control.

In the method according to the present invention, Tc is not given as a fixed value, but the minimum values Tam and Tbm for Ta and Tb are given as fixed values. If R is near to Ra, Tb is set at Tb=Tbm and Ta takes a value corresponding to R. If R is near Rb, Ta is set at Ta=Tam and Tb takes a value corresponding to R. As a result, Tc will take a value which depends on the value R.

When the value R is renewed at the end of each upper-level control cycle Tr, only Ta and Tb are renewed and the duration of state A or B bridging the two Tr cycles is aggregated and compared with the renewed Ta or Tb. This allows to follow the change of R smoothly and quickly. If R should take the value Ra, Rb or O, or if R has changed from positive to negative or vice versa, the position or state will be changed over instantly as required even if the duration of the state at the time of renewal is still short of the renewed duration Ta or Tb. Thus, the transition from one cycle Tr to another can be very smooth and at the same time the renewed R can be attained rapidly and accurately.

Further, the values Ta, Tb, Tam and Tbm can be set at multiples of a unit period To, so that a digital computer can be used to calculate them digitally in To units. The upper-level control period Tr does not necessarily have to be multiples of To.

The duty factor control method of the present invention is applicable to a multi-channel simultaneous control system. In that case, its control can be started from any channel for which new R, and thus Ta and Tb have been determined. The control of each channel is carried out in the same manner as described above.

In summary, according to the present invention, the control response speed and accuracy in a controlled system including discrete-position type electromechanical actuators such as solenoid valves or step motors can be remarkably increased without imparing the smoothness of control.

Other features and objects of the present invention will become apparent from the following description taken with reference to the accompanying drawings, in which:

FIG. 1 is a block diagram of a system to which the cycle variable duty factor control method according to the present invention is applicable;

FIG. 2 is a graph showing the relationship between two durations of states in the method of the present invention;

Figure 3:
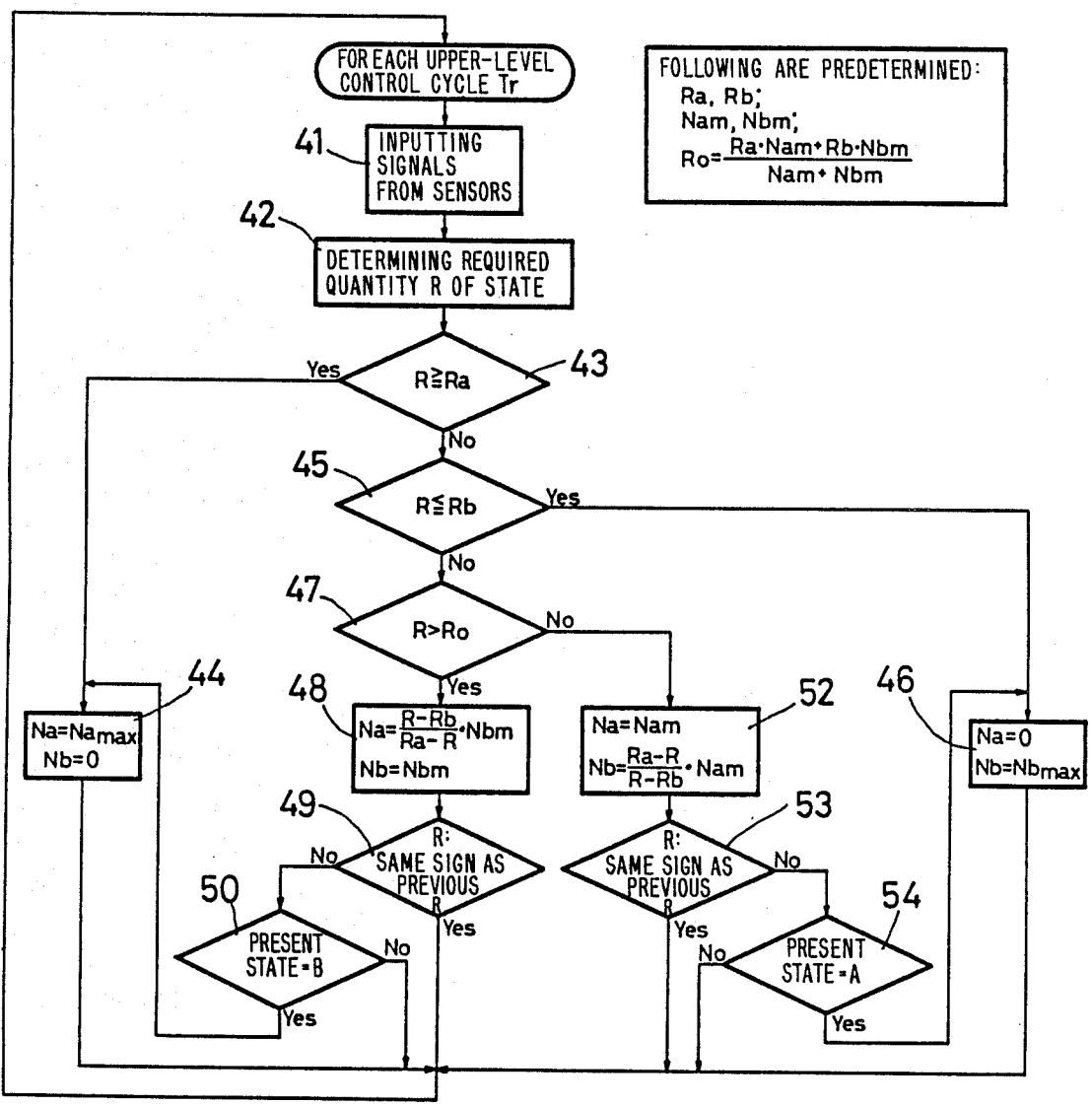
Figure 5:
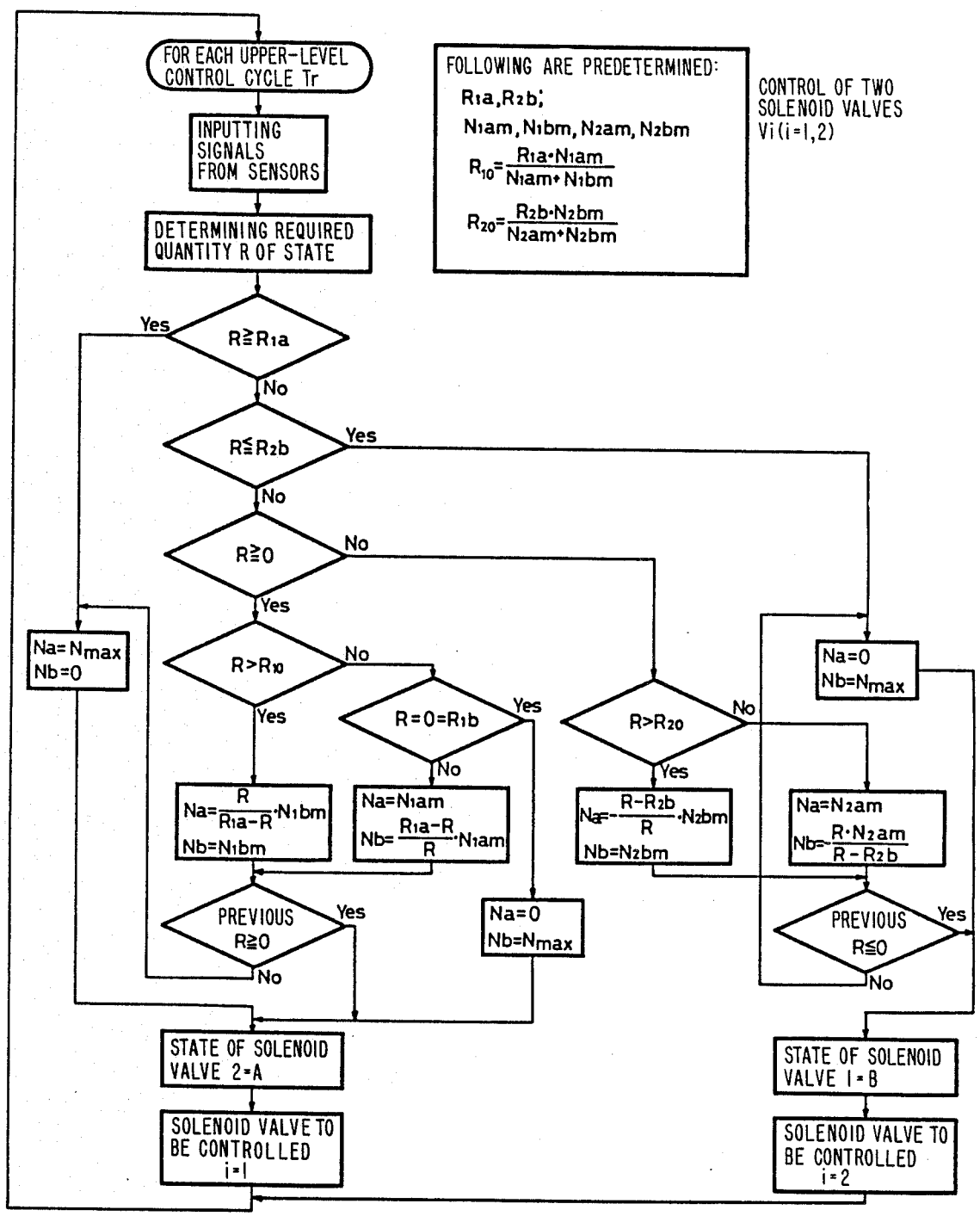
Figure 6:
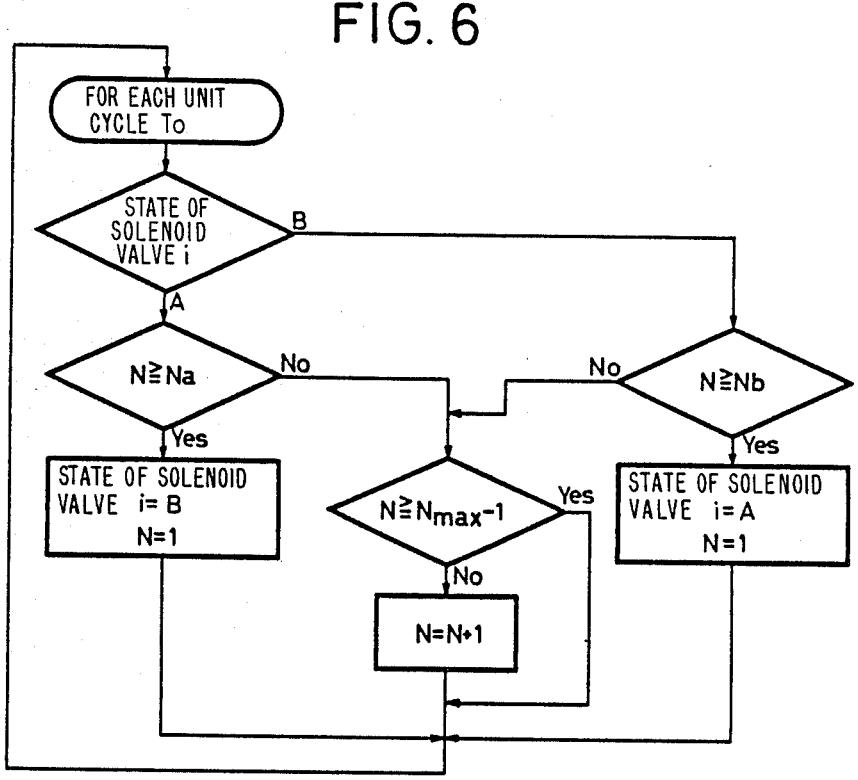
Figure 8:
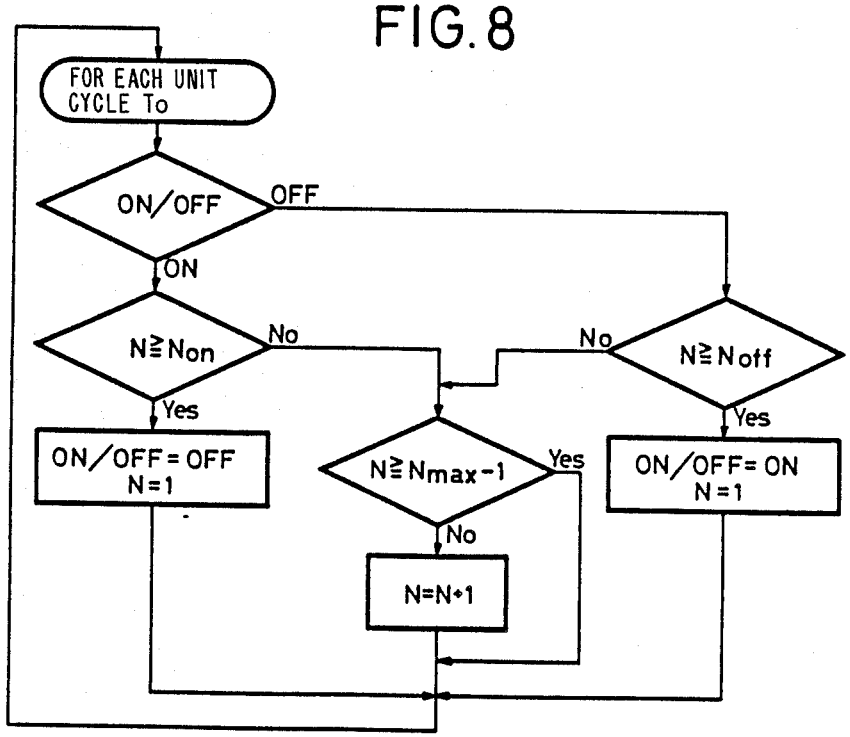
Figure 7:
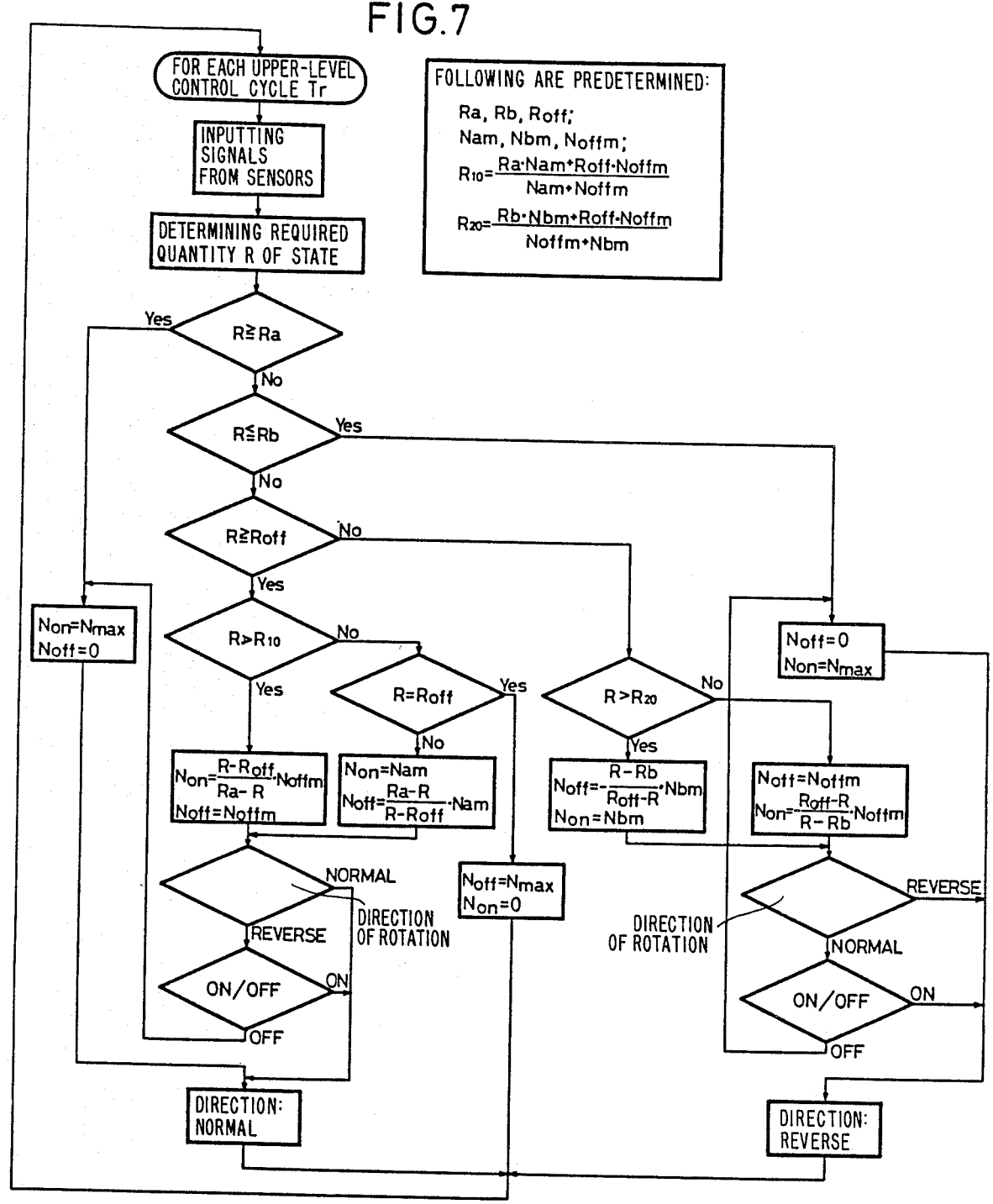

FIGS. 3, 5 and 7 are flow charts of operation programs for each upper-level control cycle for use in an embodiment of the present invention; and FIG. 4, 6 and 8 are flow charts showing routines for each unit period, corresponding to the programs of FIGS. 3, 5 and 7, respectively.

FIG. 1 shows one example of a system configuration in which the variable-cycle duty factor control method in accordance with the present invention is applied. The system includes a microcomputer 1, a solenoid valve driving circuit 2, solenoid valves 3 as discrete-position type electromechanical actuators which can take positions A and B giving quantities Ra and Rb, respectively (such as flow rates or pressure), devices 4 to be controlled by the solenoid valves 3 according to the duty factor, such as brake pressure control modulators and brakes for an automobile, and a sensor output processing circuit 5 for processing and inputting into the microcomputer 1 the outputs of various sensors such as wheel speed sensors and brake pressure sensors for detecting the conditions of the controlled devices 4. The microcomputer 1 has a function 11 for calculating a required quantity R, a function 12 for calculating Ta and Tb, and a function 13 for deciding whether or not it is necessary to switch from one state to the other. These three functions are illustrated in the form of blocks in FIG. 1. Ta and Tb represent the durations of position or state A (first state) and position or state B (second state), respectively, required to obtain a desired quantity R.

Upon receiving the outputs from various sensors provided at the controlled devices 4 through the sensor output processing circuit 5, the microcomputer 1 will calculate a required quantity R (in the function block 11) on basis of the sensor outputs for each upper-level control period Tr (not necessarily fixed), and calculate the duration Ta for the first state and the duration Tb for the second state from the target quantity R on the basis of Ra, Rb, Tam and Tbm (in the function block 12).

Further, the microcomputer 1 checks for every unit cycle To whether period Ta or Tb has passed or not, in other words whether or not it is necessary to change position from the present state to the other (from state A to state B or vice versa). If it is judged to be necessary, the microcomputer will command the solenoid valve driving circuit 2 to switch the solenoid valve 3 from the present state to the other (in the block 13).

Instead of calculating Ta and Tb in block 12, integers Na and Nb which satisfy formulas Ta=Na.To, Tb=Nb.To may be calculated for each upper-level control cycle and be preset in presettable counters In that case, it may be decided whether or not to switch position from one state to the other (in block 13), depending upon whether or not the clock pulse count of period To (or the number of input pulses to the counter) has reached the preset value.

One of the following formulas (I) and (II) is used to obtain durations Ta and Tb for achieving a required quantity R in the shortest possible period of time:

$$Ta = \frac{R - Rb}{Ra - R} \cdot Tbm, \ Tb = Tbm \quad \text{(I)}$$

$$Ta = Tam, \ Tb = \frac{Ra - R}{R - Rb} \cdot Tam \quad \text{(II)}$$

$$Ro = \frac{Ra \ Tam + Rb \ Tbm}{Tam + Tbm}$$

If R>Ro, then formula (I) should be used, and if R<Ro, then formula (II) should be used, wherein Ro is a quantity at which the formula should be changed over. This is because, as is apparent from formulas $$Ta = \frac{R - Rb}{Ra - R} \cdot Tb, \ Tb = \frac{Ra - R}{R - Rb} \cdot Ta$$

which are led from $$R = \frac{Ra \ Ta + Rb \ Tb}{Ta + Tb},$$

it is advantageous to determine the duty factor supposing Ta=Tam if R is near Ra and supposing Tb=Tbm if R is near Rb, and Ro is given by the following formula when Ta=Tam and Tb=Tbm.

$$Ro = \frac{Ra \ Tam + Tb \ Tbm}{Tam + Tbm}$$

(See FIG. 2 in which Ra>Rb). Of course, if Tam=Tbm, then $$Ro = \frac{Ra + Rb}{2}.$$

FIG. 2 shows by a solid line how Ta and Tb change with Tam and Tbm fixed.

Every time R and thus Ta and Tb are renewed at the end of each upper-level control cycle Tr, the microcomputer calculates how long the present state has lasted and compares the duration of pulse to the renewed Ta or Tb in the block 13. This enables the computer to smoothly and rapidly follow the change of R. In order to further improve the responsiveness, if the required value R takes the value Ra or Rb or if the R value changes from positive to negative or vice versa, one of the renewed Ta and Tb may be forcibly set at its maximum while setting the other at 0, instead of calculating Ta and Tb in an ordinary operation mode. Thus, control can be started from the desired state when the next routine period To begins. It is a big advantage that no special judgement is required for the control carried out for each period To.

Next, a program for carrying out the functional blocks 12 and 13 will be described by way of example with reference to FIG. 3 supposing that the quantities Ra, Rb of state A and B for the solenoid valves 3 are Ra>0 and Rb<0.

In FIG. 3, the output signals from the sensors of the solenoid valves 3 and the controlled devices 4 are inputted into the microcomputer 1 through the sensor output processing circuit 5 (Step 41) for each upper-level control cycle (Tr). The microcomputer determines a desired quantity R on the basis of the sensor signals (Step 42). Quantities Ra and Rb, and Nam and Nam (which are integers which satisfy formulas Ram=To·Nam and Rb=To·Nbm, respectively) are predetermined beforehand. The value Ro is also predetermined beforehand so as to satisfy formula $$Ro = \frac{Ra \cdot Nam + Rb \cdot Nbm}{Nam + Nbm}$$

In Step 43, it is judged whether or not $R \geq Ra$. If it is, Na=Nmax and Nb=0 are set in a presettable counter in Step 44. Na and Nb thus determined are used during the next Tr period in the control routine for each unit period To in accordance with the flow chart of FIG. 4.

If $R<Ra$ in Step 43, then it is judged whether or not $R \leq Rb$ in Step 45. If $R \leq Rb$, then Na=0 and Nb=Nbmax are set in the presettable counter in Step 46 and the routine shown in FIG. 4 is repeated for every period To. If $R>Rb$ (i.e. $Ra>R>Rb$) in Step 45, it is judged in Step 47 whether or not $R>Ro$. If $R>Ro$, then Na and Nb (corresponding to Ta and Tb, respectively) are determined as $$Na = \frac{R - Rb}{Ra - R} \cdot Nbm, \, Nb = Nbm$$

and then preset in the presettable counter. In Step 49, it is judged whether or not the plus/minus sign of R is the same as that of R in the previous Tr cycle. If it is, the routine for each period To shown in FIG. 4 receives Na, Nb thus determined.

If it is judged in Step 49 that R has an opposite sign to that of the previous R, it is judged in Step 50 whether or not the present state is state B. If it is, step 44 will change the state forcibly to state A at the next period To. If it is determined in Step 50 that the present state is not B but A, Na and Nb will be transferred to the routine of FIG. 4. Thus, when the plus/minus sign of R is reversed, the renewed required quantity R will be attained without delay.

If it is judged in Step 47 that $R<Ro$, then Na and Nb are determined as $$Na = Nam, \, Nb = \frac{Ra - R}{R - Rb}.$$

and preset in the presettable counter Simultaneously, it is determined in Step 53 whether or not the plus/minus sign of R is the same as that of R in the previous Tr cycle. If it is, Na, Nb for the routine in FIG. 4 for period To is settled. If not, it is judged in Step 54 whether or not the present state is state A. If it is, it is switched to state B in Step 46. If the present state is B in Step 54, Na, Nb is passed to the routine of FIG. 4 as determined in Step 52.

In the routine of FIG. 4, it is judged for every unit period To whether the present state is A or B (in Step 56). If it is A, it is determined in Step 57 whether or not the count of the counter has reached the preset number Na, i.e. $N \geq Na$. If $N \geq Na$, a command will be given to switch from state A to state B, and the count N of the counter for state B is set at N=1 (Step 58) to wait for the judgement Step 56 in the next To cycle to start.

If the present state is found to be state B in step 56, it is judged in Step 59 whether or not the count N of the counter has reached the preset value Nb, i.e. $N>Nb$. If $N>Nb$, the program will give a command to shift position to state A and set the count N of the counter for state A at N=1 (Step 60). Then, Step 56 in the subsequent To cycle will start.

Every time it is judged in Step 57 or 59 that $N<Na$ or $N<Nb$, the counter will add one count to the count N in Step 62. In order to prevent the state from being switched in Step 57 or 59 when the preset value is at Namax, the maximum of the count N is limited at Namax-1 in Step 61. Thus, if the preset value is at Nbmax, the same state will persist indefinitely.

Separate presettable counters may be provided for the states A and B or a single counter may be used for both. According to the program shown by the flow charts of FIGS. 3 and 4, the routine for every unit period To will be executed smoothly in an unchanged manner even if period Tr of the upper-level control cycle comes to an end and the required quantity R and thus Ta, Tb, Na and Nb change. This assures a smooth control. As will be understood from the foregoing description, Tr does not have to be a constant value but may be variable with condition, nor have to be a multiple of To.

In view of the frequency of the routines executed for every period To, the routine has to be as simple as possible. Otherwise it may increase the entire operation time, thus making difficult high-quality control with a short Tr. Therefore, even if it is necessary to give a command to shift position to the other state, ignoring the duration of the present state, in a special case e.g. when the required R has become Ra or Rb or the plus/minus sign of R has reversed, it is desirable that such a procedure be completed in the upper-level control loop (for each period Tr) so that no extra procedure will be carried over into the routine for period To.

In this embodiment, in case the sign of R has reversed, it is possible that either Ra or Rb nearer to the renewed R may persist for the period Tr. This means that either Ra or Rb persists for a longer period than period Ta or Tb which is a value calculated to obtain the required quantity R. As a result, the actual quantity tends to overshoot the target quantity R temporarily by the end of period Tr. But, such an overshoot is practically negligible unless period Tr is very long compared with Tam and Tbm, since after the reversal of positive-negative sign of R, more energy than usual is often required to drive the electromechanical actuators.

On the other hand, parts in the program shown at 49, 50, 53 and 54 of FIG. 3 may be omitted and Na and Nb calculated at 48 and 52 may be used as they are. In such a case, a time lag equal to Tam or Tbm at maximum may result until a command for the change of position is actually issued after the reversal of plus/minus sign of R. But Tam or Tbm is usually negligibly short compared with the entire control time. Thus practically such a delay will not pose any problem in many cases.

FIGS. 5 and 6 are flow charts of a program adapted to be used in applying the variable-cycle type duty factor control method of the present invention to electromechanical actuators comprising a solenoid valve having two state quantities $R1a>0$ and $R1b=0$ and another one having two state quantities $R2a=0$ and $R2b<0$. FIGS. 7 and 8 are flow charts of a program applicable to a three-position electromechanical actuator which can take three positions among normal rotation ON (state quantity Ra>0), OFF (state quantity Roff) and reverse rotation ON (state quantity of state Rb<0) (such an actuator is e.g. a variable speed step motor). This program can respond to the change of polarity of R as swiftly as the program shown in FIG. 3.

In the abovesaid embodiments, Ra, Rb, Nam and Nbm are assumed to be constants. But they may be functions of variables (such as quantities themselves or their integrated values). If they are variable, these values are reestablished at the beginning of each cycle Tr. This will not affect the routine for each period To in any manner. Accordingly, the logical operations in each period To which are repeated at a high frequency can be completed in a short time and thus the unit period To can be set at a small value. This will allow the actuator to be controlled in a more responsive and smoother manner.

The smaller the Tam and Tbm (or Nam and Nbm), the more smoothly the actuators can be controlled. But, as mentioned before, their minimum values are limited by the structure of the actuators themselves. For example, in the control of FIG. 5, it is preferable to set the values of Tam or Tbm as small as possible especially if the absolute value of R is small. But if Tam or Tbm is preset too small, even when the absolute value of R increases so as to come close to R10 or R20, the electromechanical actuator (such as a solenoid valve) cannot switch to the other position until R becomes larger than R10 or R20 and thus Ta or Tb gets larger than Tam or Tbm. Thus, in order to assure smooth control throughout the entire range of R, it is necessary that Tam and Tbm be variable with the value of R. For example, in FIG. 5, Tam may be set at an extremely small value if R=0 and be adapted to increase gradually or in steps as R approaches $R_{10}$.

Further, it is not necessary that Tr>>Tam (=Nam.To) or Tr>>Tbm (=Nbm.To). Even if Tr is smaller than Tam and Tbm, it will present practically no problem. Thus, Tr can be set very small compared with Tam and Tbm. This remarkably increases the quickness and the smoothness of control. Further, since the routine for each period To is unchanged independently of the timing of the upper-level control cycle Tr, the control unit for this routine may be in the form of a custom IC. Also, the logical operations repeated at Tr and the routine for each period To may be integrated into one custom IC so that all the control procedures after having received the required R will be processed in a single custom IC. The routine for each period To may be interrupted momentarily by use of a known technique only while the values of Na and Nb are being changed over.

The actual values of Ra, Rb, Tam (or Nam) and Tbm (or Nbm) may deviate from the estimated values as a result of accumulated manufacturing errors for the parts of the actuators or a change in the environmental conditions (such as temperature or supply voltage). In order to cope with this problem, the program may be provided with the function of gradually changing the originally estimated values of Ra, Rb, Tam and Tbm for control more adapted to the reality if the tendency of deviation becomes conspicuous during several rounds of upper-level control periods. Such a correction should preferably be made only if it is clearly known how the conditions of the system picked up by sensors would be, if the quantity R as desired is achieved by the electromechanical actuator.

The values of Ra, Rb, Tam and Tbm which have been corrected by learning may be erased from the memory of the microcomputer 1 when it is switched off and when the computer is turned on next time, the control may start with the initial preset values. But preferably, the computer should be provided with a suitable memory means (such as a so-called EEPROM) to store the values corrected by learning even after having been turned off and to start next time with the corrected values.

Even in the routine for each period Tr, it is not desirable to include a division process because it requires an additional operation time. On th other hand, so fine a resolution is usually not required for the desired value of R. Twenty graduations from R Max. to R Min. would be sufficient in most cases. This tendency will be more dominant if the desired target quantity is not the quantity of the controlled device itself but its differentiated value. In such a case, Na and Nb may be picked out of a reference table preset in the program instead of calculating them every time R is determined This table look-up method is particularly useful when Tam and Tbm (Nam and Nbm) are changed according to the value of R as already mentioned. In this case, learning correction also can be carried out simply by shifting the rank to be picked up in the table.

What is claim is:

1. A variable-cycle duty factor control method for a discrete-position type electromechanical actuator which can take only a plurality of mutually discrete positions, in which the actuator is controlled to take any desired intermediate condition approximately by varying the ratio between durations of said discrete positions, said method comprising the steps of setting a fixed unit cycle To which is shorter than an upper-level control cycle Tr which is the cycle for an upper-level control loop, calculating and setting for every upper-level control cycle Tr a duration Ta for a first position of said actuator and a duration Tb for a second position of said actuator on the basis of a desired quantity R for the desired intermediate condition so that said Ta and Tb values will be multiples of said To value and will not be smaller than their minimum values Tam and Tbm, respectively, which are determined by the dynamic characteristics of said actuator, judging for every cycle To whether or not the duration for said first or second position has reached said value Ta or Tb, in other words whether or not it is necessary to switch from one position to the other, and issuing a command to change the position from one to the other if so judged.

2. A method as claimed in claim 1, wherein said durations Ta and Tb are calculated from one of the following formula: if R>Ro, wherein $$Ro = \frac{Ra\ Tam + Rb\ Tbm}{Tam + Tbm} \qquad (I)$$

$$Ta = \frac{R - Rb}{Ra - R} \cdot Tbm,\ Tb = Tbm$$

if $R < Ro$ $$Ta = Tam,\ Tb = \frac{Ra - R}{R - Rb} \cdot Tam \qquad (II)$$

wherein Ra is the quantity of said first position and Rb is the quantity of said second position, Ra≧R>Rb.

3. A method as claimed in claim 1 or 2, wherein the duration of time of said first or second position is carried over to the next cycle Tr so that the position will be maintained until the total duration exceeds a renewed Ta or Tb value.

4. A method as claimed in claim 3, wherein if said desired quantity R is set at the quantity Ra (maximum value of R) for the first position or the quantity Rb (minimum value of R) for the second position, or if the plus/minus sign of R is reversed at the calculation of each cycle Tr, the Ta and Tb values are set forcibly at such values as to attain said renewed R in the shortest possible time irrespectively of the duration of the state at the time of determination of new Ta or Tb value.

5. A method as claimed in claim 4, wherein Tam and Tbm are variable with the value of R.

6. A method as claimed in claim 5, further comprising the steps of in said upper-level control cycles judging from the result of control operation whether the constants Ra, Rb, Tam and Tbm (or Nam and Nbm) used to determine the values of Ta and Tb (or Na and Nb) are too large or too small or not, and of correcting said constants suitably by learning.

7. A method as claimed in claim 6, wherein said step of calculating the duration Ta of said first position and the duration Tb of said second position comprises the step of determining integers Na and Nb which satisfy formulas, Na=Ta/To, Nb=Tb/To, and said step of judging whether or not the duration has reached Ta or Tb comprises the step of judging whether or not the count of a counter incremented for each cycle To has reached said preset value Na or Nb.

8. A method as claimed in claim 7, wherein the values of Na and Nb which correspond to the value of R are calculated and listed in a table beforehand so that the Na and Nb values corresponding to each renewed quantity R can be picked out from said table for each upper-level control cycle Tr, whereby eliminating the need of calculating the Na and Nb values by use of said formulas (I) and (II) every time R is renewed.

9. A method as claimed in claim 8, wherein said discrete-position type electromechanical actuator is switchable between two different positions including a first position in which Ra>0 and a second position in which Rb>0.

10. A method as claimed in claim 8, wherein there are provided two discrete-position type electromechanical actuators controlled jointly, a first actuator being switchable between a first position R1a>0 and a second position R1b=0 and a second actuator being switchable between a first position R2a=0 and a second position R2b<0.

11. A method as claimed in claim 8, wherein said discrete-position type electromechanical actuator can take three positions which has a first position R+>0, a second position Roff and a third position R−<0, and is controlled with Ra=R+ and Rb=Roff if the desired quantity R is set as R>Roff, and with Ra=Roff and Rb=R−, if R<Roff.

* * * * *